(12) United States Patent
Ryu et al.

(10) Patent No.: US 11,431,396 B2
(45) Date of Patent: Aug. 30, 2022

(54) BEAM FAILURE RECOVERY IN A SECONDARY CELL

(71) Applicant: QUALCOMM Incorporated, San Diego, CA (US)

(72) Inventors: Jung Ho Ryu, Fort Lee, NJ (US); Yan Zhou, San Diego, CA (US); Tao Luo, San Diego, CA (US); Junyi Li, Chester, NJ (US); Kiran Venugopal, Raritan, NJ (US); Tianyang Bai, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/947,915

(22) Filed: Aug. 24, 2020

(65) Prior Publication Data
US 2021/0067229 A1    Mar. 4, 2021

Related U.S. Application Data

(60) Provisional application No. 62/891,857, filed on Aug. 26, 2019.

(51) Int. Cl.
*H04B 7/06* (2006.01)
*H04W 72/12* (2009.01)
(Continued)

(52) U.S. Cl.
CPC ........ *H04B 7/0695* (2013.01); *H04W 72/042* (2013.01); *H04W 72/046* (2013.01);
(Continued)

(58) Field of Classification Search
CPC .. H04B 7/0695; H04W 76/19; H04W 72/042; H04W 72/046; H04W 72/1263;
(Continued)

(56) References Cited

U.S. PATENT DOCUMENTS 10,873,866 B2 * 12/2020 Kim .................... H04B 7/0695
2019/0037423 A1    1/2019 Yu et al.
(Continued)

FOREIGN PATENT DOCUMENTS

| EP | 3716713 A1 | 9/2020 |
| WO | WO-2019032882 A1 | 2/2019 |
| WO | WO-2019137378 A1 | 7/2019 |

OTHER PUBLICATIONS

ASUSTEK: "Remaining Issues on Beam Failure Recovery Procedure," 3GPP Draft, 3GPP TSG RAN WG1 Meeting #93, R1-1807211, Remaining Issues on Beam Failure Recovery Procedure, 3rd Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, May 11, 2018 (May 11, 2018), XP051462175, 4 pages, Retrieved from the Internet: URL: http://www.3gpp.org/ftp/tsg%5Fran/WG1%5FRL1/TSGR1%5F93/Docs [retrieved on May 11, 2018] the whole document.

(Continued)

*Primary Examiner* — Mewale A Ambaye
(74) *Attorney, Agent, or Firm* — Harrity & Harrity, LLP

(57) ABSTRACT

Various aspects of the present disclosure generally relate to wireless communication. In some aspects, a user equipment (UE) may transmit a beam failure recovery scheduling request (BFR-SR) to a primary cell or a primary secondary cell base station based at least in part on detecting a beam failure associated with a secondary cell (SCell) link between the UE and an SCell base station. The UE may start a timer based at least in part on transmitting the BFR-SR. The UE may retransmit the BFR-SR based at least in part on the timer expiring prior to the UE receiving a response to acknowledge the BFR-SR and schedule transmission of a medium access control (MAC) control element (MAC-CE) including information to recover from the beam failure (Continued)

and/or the timer expiring prior to the UE transmitting the MAC-CE. Numerous other aspects are provided.

30 Claims, 9 Drawing Sheets

(51) Int. Cl.
    *H04W 76/19*     (2018.01)
    *H04W 74/08*     (2009.01)
    *H04W 72/04*     (2009.01)
    *H04W 80/02*     (2009.01)

(52) U.S. Cl.
    CPC ... *H04W 72/1263* (2013.01); *H04W 74/0833* (2013.01); *H04W 76/19* (2018.02); *H04W 80/02* (2013.01)

(58) Field of Classification Search
    CPC . H04W 74/0833; H04W 80/02; H04W 74/08; H04W 16/28; H04W 72/04; H04W 36/0033; H04W 7/0495; H04W 7/08; H04W 7/06
    See application file for complete search history.

(56) References Cited

U.S. PATENT DOCUMENTS

| | | | |
|---|---|---|---|
| 2019/0215048 A1* | 7/2019 | Cirik | H04B 7/088 |
| 2019/0253986 A1* | 8/2019 | Jeon | H04B 7/0695 |
| 2020/0260428 A1* | 8/2020 | Xu | H04L 5/0048 |
| 2020/0351129 A1* | 11/2020 | Kwak | H04B 7/0695 |
| 2020/0383167 A1* | 12/2020 | Sengupta | H04W 72/0413 |
| 2021/0013949 A1* | 1/2021 | Agiwal | H04W 16/28 |
| 2021/0014010 A1* | 1/2021 | Babaei | H04L 1/1642 |
| 2021/0028912 A1* | 1/2021 | Xu | H04W 72/0446 |

OTHER PUBLICATIONS

International Search Report and Written Opinion—PCT/US2020/047803—ISA/EPO—dated Nov. 23, 2020.

* cited by examiner

BEAM FAILURE RECOVERY IN A SECONDARY CELL

CROSS-REFERENCE TO RELATED APPLICATION

This patent application claims priority to U.S. Provisional Patent Application No. 62/891,857, filed on Aug. 26, 2019, entitled "BEAM FAILURE RECOVERY IN A SECONDARY CELL," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for beam failure recovery in a secondary cell (SCell).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: transmitting a beam failure recovery scheduling request (BFR-SR) to a primary cell (PCell) or a primary secondary cell (PSCell) base station based at least in part on detecting a beam failure associated with a secondary cell (SCell) link between the UE and an SCell base station; starting a timer based at least in part on transmitting the BFR-SR; and retransmitting the BFR-SR based at least in part on the timer expiring prior to one or more of: the UE receiving a response to acknowledge the BFR-SR and schedule transmission of a medium access control (MAC) control element (MAC-CE) including information to recover from the beam failure, or the UE transmitting the MAC-CE.

In some aspects, a UE for wireless communication includes: a memory; and one or more processors operatively coupled to the memory, the memory and the one or more processors configured to: transmit a BFR-SR to PCell or a PSCell base station based at least in part on detecting a beam failure associated with an SCell link between the UE and an SCell base station; start a timer based at least in part on transmitting the BFR-SR; and retransmit the BFR-SR based at least in part on the timer expiring prior to one or more of: the UE receiving a response to acknowledge the BFR-SR and schedule transmission of a MAC-CE including information to recover from the beam failure, or the UE transmitting the MAC-CE.

In some aspects, a non-transitory computer-readable medium storing a set of instructions for wireless communication includes: one or more instructions that, when executed by one or more processors of a UE, cause the UE to: transmit a BFR-SR to a PCell or a PSCell base station based at least in part on detecting a beam failure associated with an SCell link between the UE and an SCell base station; start a timer based at least in part on transmitting the BFR-SR; and retransmit the BFR-SR based at least in part on the timer expiring prior to one or more of: the UE receiving a response to acknowledge the BFR-SR and schedule transmission of a MAC-CE including information to recover from the beam failure, or the UE transmitting the MAC-CE.

In some aspects, an apparatus for wireless communication includes: means for transmitting a BFR-SR to a PCell or a PSCell base station based at least in part on detecting a beam failure associated with a SCell link between the apparatus and an SCell base station; means for starting a timer based at least in part on transmitting the BFR-SR; and means for retransmitting the BFR-SR based at least in part on the timer expiring prior to one or more of: the apparatus receiving a response to acknowledge the BFR-SR and schedule transmission of a MAC-CE including information to recover from the beam failure, or the apparatus transmitting the MAC-CE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
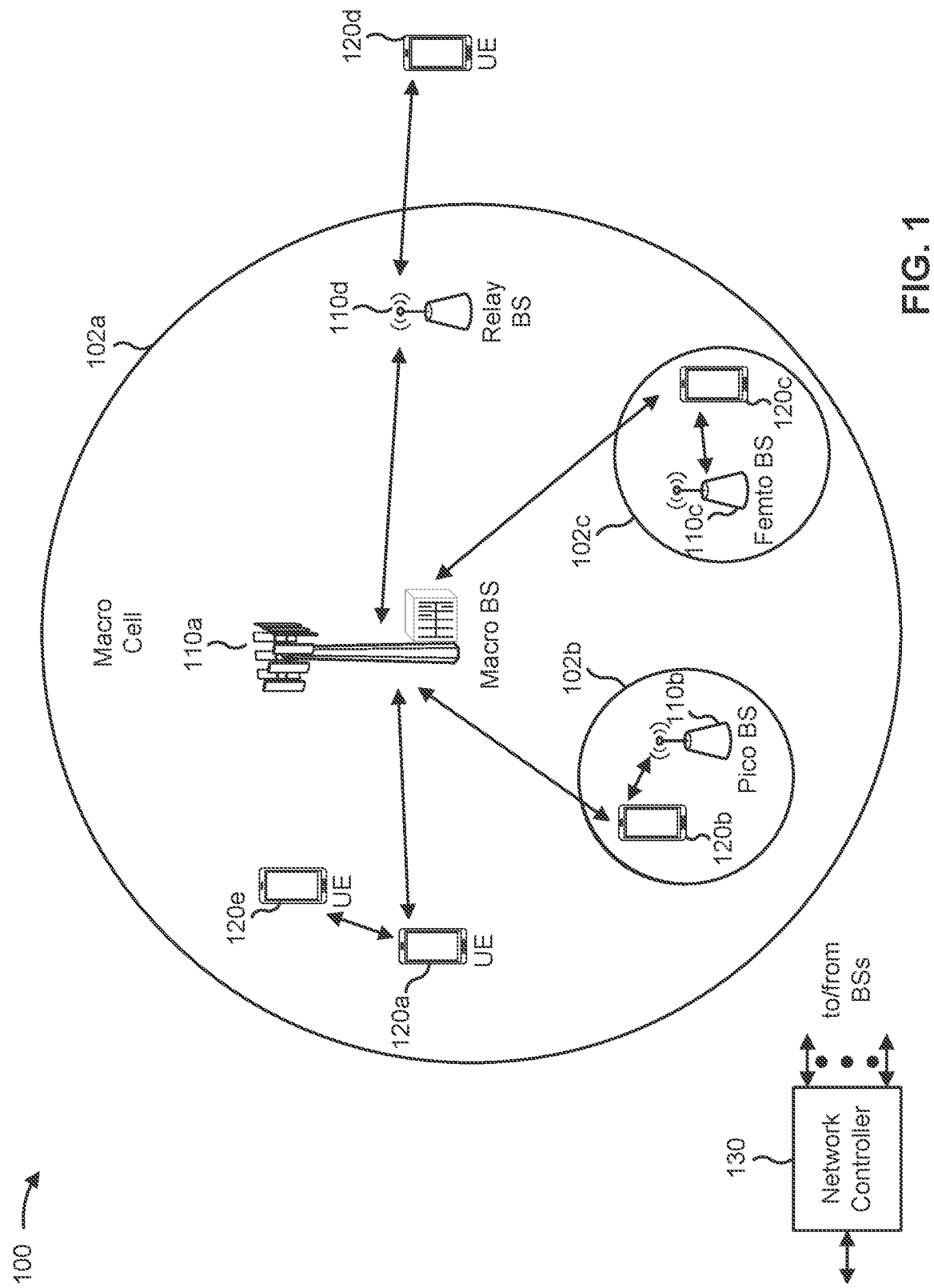
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
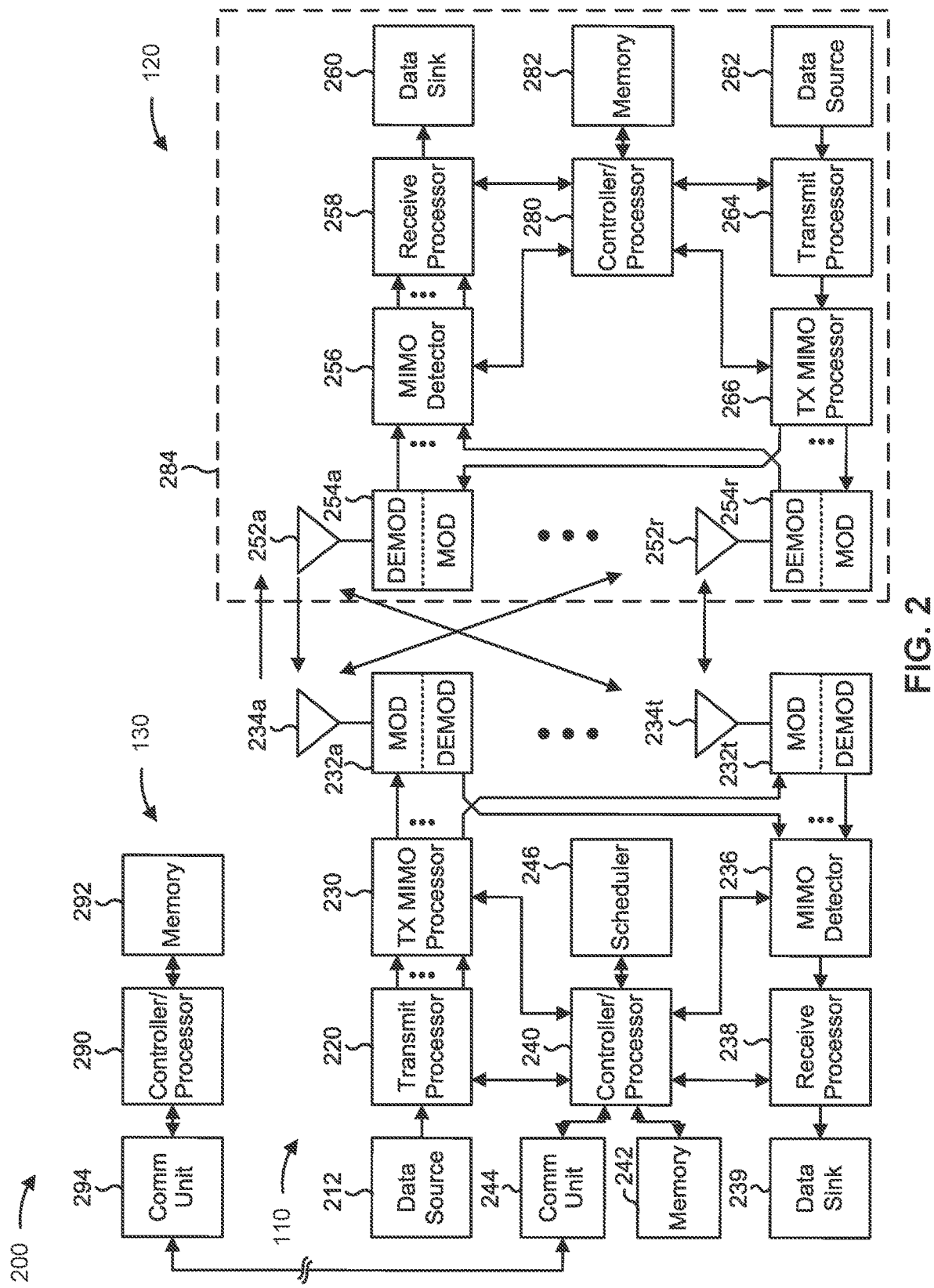
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 8-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 8-9.

Controller/processor 240 of base station 110, controller/processor 280 of UE 120, and/or any other component(s) of FIG. 2 may perform one or more techniques associated with beam failure recovery in a secondary cell (SCell), as described in more detail elsewhere herein. For example, controller/processor 240 of base station 110, controller/processor 280 of UE 120, and/or any other component(s) of FIG. 2 may perform or direct operations of, for example, process 900 of FIG. 9 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 900 of FIG. 9 and/or other processes as described herein. In some aspects, executing instructions may include running the instructions, converting the instructions, compiling the instructions, interpreting the instructions, and/or the like.

In some aspects, UE 120 may include means for transmitting a beam failure recovery scheduling request (BFR-SR) to a primary cell (PCell) or a primary secondary cell (PSCell) base station 110 based at least in part on detecting a beam failure associated with an SCell link between UE 120 and an SCell base station 110, means for starting a timer based at least in part on transmitting the BFR-SR, means for retransmitting the BFR-SR based at least in part on the timer expiring prior to one or more of UE 120 receiving a response to acknowledge the BFR-SR and schedule transmission of a medium access control (MAC) control element (MAC-CE) including information to recover from the beam failure or UE 120 transmitting the MAC-CE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
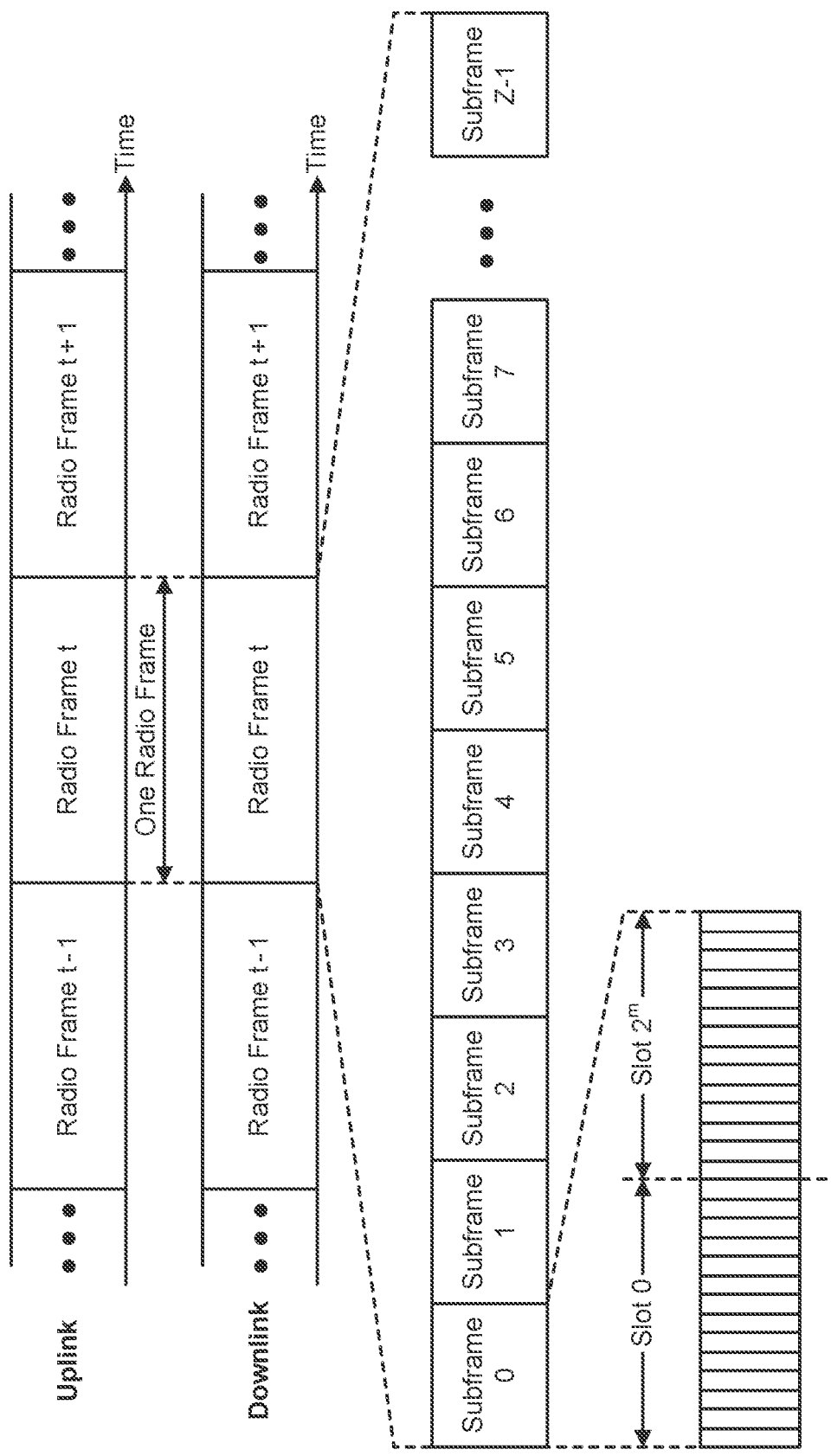
FIG. 3 is a diagram illustrating an example of a frame structure in a wireless communication network, in accordance with various aspects of the present disclosure.

FIG. 3 is a diagram illustrating an example 300 of a frame structure in a wireless communication network, in accordance with various aspects of the present disclosure. The frame structure shown in FIG. 3 is for frequency division duplexing (FDD) in a telecommunication system, such as LTE, NR, and/or the like. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3, where m is an index of a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, symbol-based, and/or the like.

As indicated above, FIG. 3 is provided as an example. Other examples may differ from what is described with respect to FIG. 3.

Figure 4:
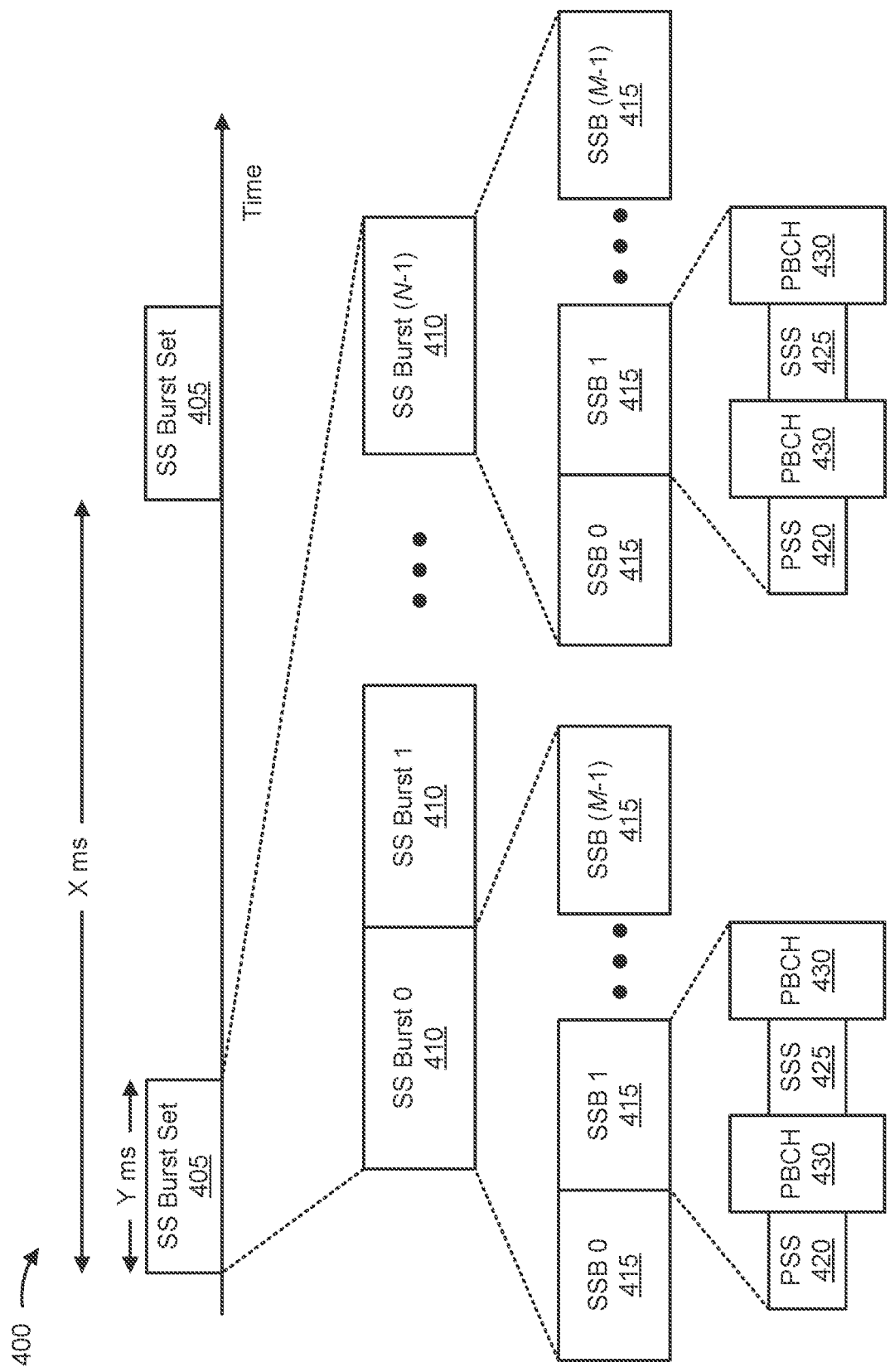
FIG. 4 is a diagram illustrating an example of a synchronization signal hierarchy, in accordance with various aspects of the present disclosure.

FIG. 4 is a diagram illustrating an example 400 of a synchronization signal (SS) hierarchy, in accordance with various aspects of the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by the base station. As further shown, each SS burst 410 may include one or more SS blocks (SSBs) 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, beam selection, and/or the like (e.g., as part of an initial network access procedure). An SS burst set 405 may be periodically transmitted by a wireless node (e.g., base station 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window, an SSB measurement time configuration (SMTC) window, and/or the like.

In some aspects, an SSB 415 may include resources that carry a primary synchronization signal (PSS) 420, a secondary synchronization signal (SSS) 425, a physical broadcast channel (PBCH) 430, and/or the like. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., base station 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., a reference signal received power (RSRP) parameter and/or the like) to a base station 110. The base station 110 and the UE 120 may use the one or more indicated SSBs 415 to select one or more beams to be used for communication between the base station 110 and the UE 120 (e.g., for a random access channel (RACH) procedure and/or the like). Additionally, or alternatively, the UE 120 may use the SSB 415 and/or the SSB index to determine a cell timing for a cell via which the SSB 415 is received (e.g., a serving cell).

As indicated above, FIG. 4 is provided as an example. Other examples may differ from what is described with regard to FIG. 4.

Figure 5:
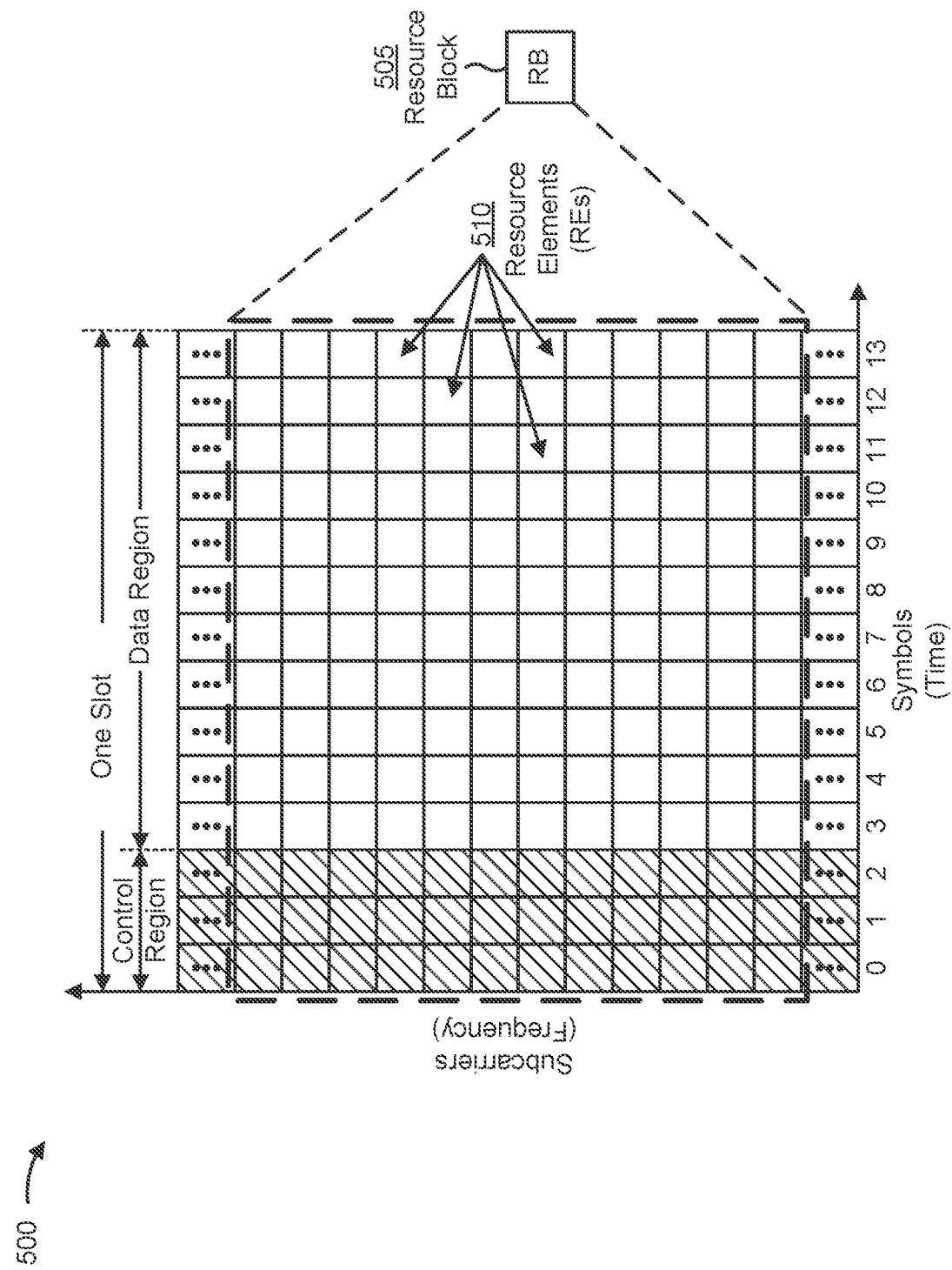
FIG. 5 is a diagram illustrating an example of a slot format, in accordance with various aspects of the present disclosure.

FIG. 5 is a diagram illustrating an example 500 of a slot format, in accordance with various aspects of the present disclosure. As shown in FIG. 5, time-frequency resources in a radio access network (RAN) may be partitioned into resource blocks, shown by a single resource block (RB) 505. An RB 505 is sometimes referred to as a physical resource block (PRB). An RB 505 includes a set of subcarriers (e.g., 12 subcarriers) and a set of symbols (e.g., 14 symbols) that are schedulable by a base station 110 as a unit. In some aspects, an RB 505 may include a set of subcarriers in a single slot. As shown, a single time-frequency resource included in an RB 505 may be referred to as a resource element (RE) 510. An RE 510 may include a single subcarrier (e.g., in frequency) and a single symbol (e.g., in time). A symbol may be referred to as an orthogonal frequency division multiplexing (OFDM) symbol. An RE 510 may be used to transmit one modulated symbol, which may be a real value or a complex value.

In some telecommunication systems (e.g., NR), RBs 505 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing, a cyclic prefix format, and/or the like). A slot may be configured with a link direction (e.g., downlink or uplink) for transmission. In some aspects, the link direction for a slot may be dynamically configured.

As indicated above, FIG. 5 is provided as an example. Other examples may differ from what is described with respect to FIG. 5.

Figure 6:
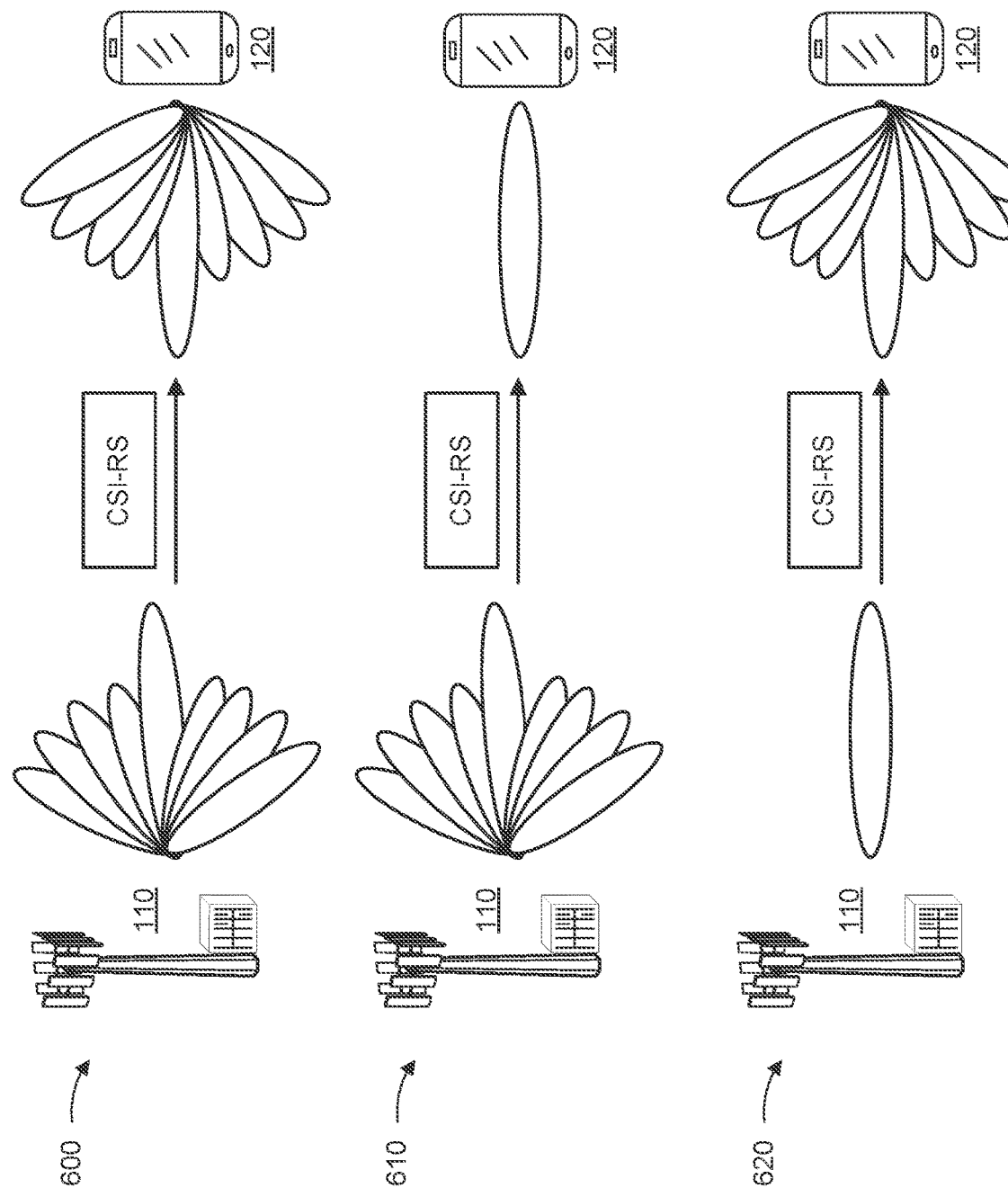
FIG. 6 is a diagram illustrating examples of beam management procedures, in accordance with various aspects of the present disclosure.

FIG. 6 is a diagram illustrating examples 600, 610, and 620 of beam management procedures, in accordance with various aspects of the present disclosure. As shown in FIG. 6, examples 600, 610, and 620 include a UE 120 in communication with a base station 110 in a wireless network (e.g., wireless network 100). However, the devices shown in FIG. 6 are provided as examples, and the wireless network may support communication and beam management between other devices (e.g., between a UE 120 and a base station 110 or transmit receive point (TRP), between a mobile termination node and a control node, between an integrated access and backhaul (IAB) child node and an IAB parent node, between a scheduled node and a scheduling node, and/or the like). In some aspects, the UE 120 and the base station 110 may be in a connected state (e.g., a radio resource control (RRC) connected state and/or the like).

As shown in FIG. 6, example 600 may include a base station 110 and a UE 120 communicating to perform beam management using one or more channel state information reference signals (CSI-RSs). Example 600 depicts a first beam management procedure (e.g., P1 CSI-RS beam management). The first beam management procedure may be referred to as a beam selection procedure, an initial beam acquisition procedure, a beam sweeping procedure, a cell search procedure, a beam search procedure, and/or the like. As shown in FIG. 6 and example 600, CSI-RSs may be configured to be transmitted from the base station 110 to the UE 120. The CSI-RSs may be configured to be periodic (e.g., using RRC signaling and/or the like), semi-persistent (e.g., using media access control (MAC) control element (MAC-CE) signaling and/or the like), and/or aperiodic (e.g., using downlink control information (DCI) and/or the like).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same reference signal resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report the measurements to the base station 110 to enable the base station 110 to select one or more beam pair(s) for communication between the base station 110 and the UE 120. While example 600 has been described in connection with CSI-RSs, the first beam management process may also use SSBs for beam management in a similar manner as described above.

As shown in FIG. 6, example 610 may include a base station 110 and a UE 120 communicating to perform beam management using CSI-RSs. Example 610 depicts a second beam management procedure (e.g., P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 6 and example 610, CSI-RSs may be configured to be transmitted from the base station 110 to the UE 120. The CSI-RSs may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE 120 using the single receive beam) reported by the UE 120.

As shown in FIG. 6, example 620 depicts a third beam management procedure (e.g., P3 CSI-RS beam management). The third beam management procedure may be referred to as a beam refinement procedure, a UE beam refinement procedure, a receive beam refinement procedure, and/or the like. As shown in FIG. 6 and example 620, one or more CSI-RSs may be configured to be transmitted from the base station 110 to the UE 120. The CSI-RSs may be configured to be aperiodic (e.g., using DCI and/or the like). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

In some aspects, if a beam that the base station 110 and the UE 120 are using for communication experiences a failure (e.g., due to a change in channel conditions, mobility of the UE 120, and/or the like), the UE 120 may initiate a beam failure recovery procedure. For example, upon detecting the beam failure, the UE 120 may attempt to communicate with the base station 110 by transmitting a beam failure recovery request (BFRQ) via one or more candidate beams (e.g., one or more beams other than the beam that has failed). However, the beam failure recovery procedure increases in complexity if the UE 120 and the base station 110 are communicating using carrier aggregation, where there are multiple cells that the UE 120 and the base station 110 may be using to communicate (e.g., a primary cell (PCell) and one or more secondary cells (SCells), which may be included in one or more SCell groups). Accordingly, some aspects described herein relate to techniques and apparatuses to assist with recovery from a beam failure in an SCell used for carrier aggregation.

As indicated above, FIG. 6 is provided as an example of beam management procedures. Other examples of beam management procedures may differ from what is described with respect to FIG. 6. For example, the UE 120 and the base station 110 may perform the third beam management procedure before performing the second beam management procedure, the UE 120 and the base station 110 may perform a similar beam management procedure to select a UE transmit beam, and/or the like.

Figure 7:
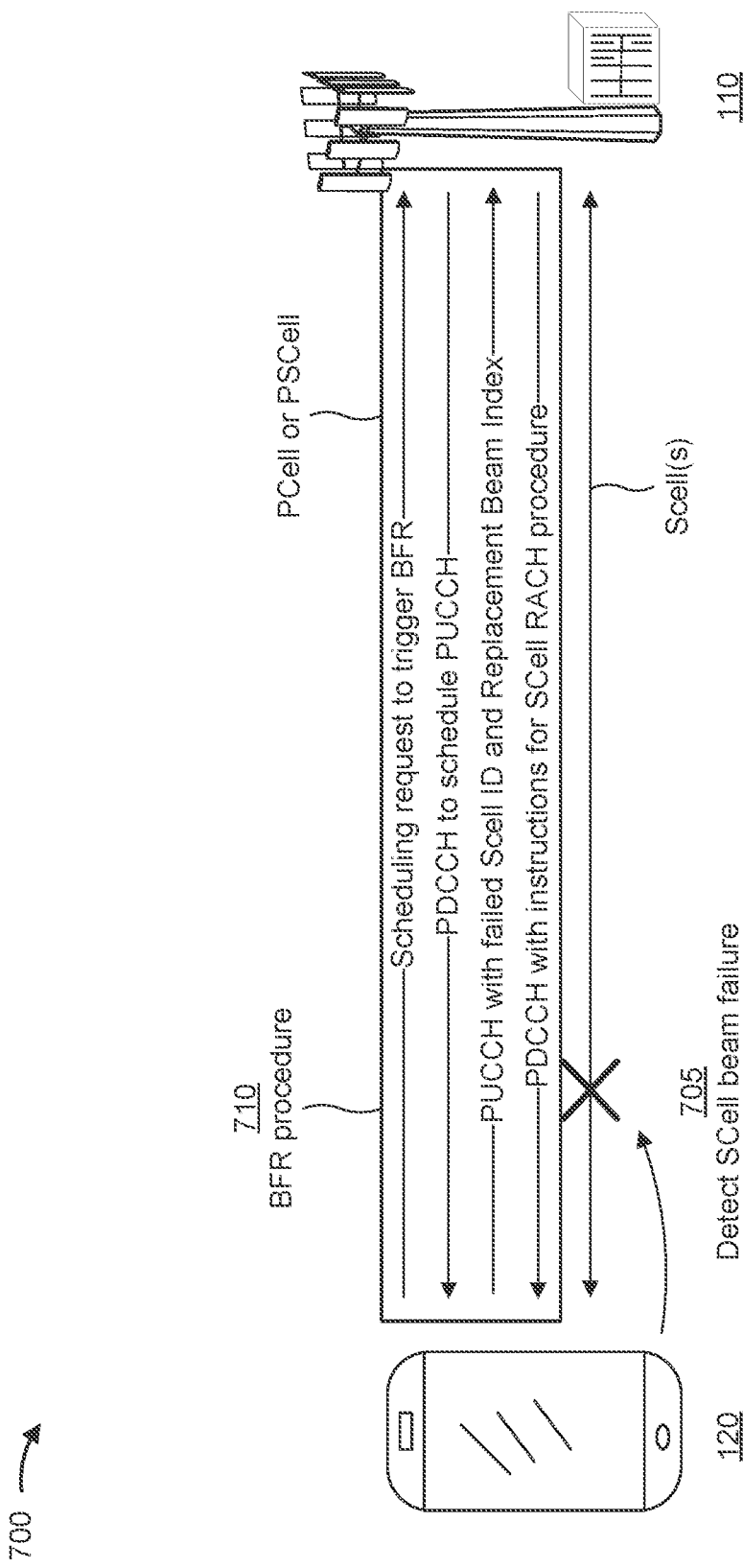
FIG. 7 is a diagram illustrating an example of a beam failure recovery procedure, in accordance with various aspects of the present disclosure.

FIG. 7 is a diagram illustrating an example 700 of a beam failure recovery procedure, in accordance with various aspects of the present disclosure. As shown in FIG. 7, a base station 110 and a UE 120 may communicate with one another using carrier aggregation. Using carrier aggregation, the base station 110 and the UE 120 may communicate with one another using a primary cell (PCell) and one or more secondary cells (SCells). In some aspects, the one or more SCells may be configured for downlink communication only, for uplink communication only, or for downlink and uplink communication. Furthermore, in some aspects, a single SCell in an SCell group (e.g., an Scell configured for downlink and uplink communication) may be designated or configured as a primary secondary cell (PSCell).

As shown in FIG. 7, and by reference number 705, the UE 120 may detect a beam failure on an SCell. As further shown by reference number 710, the UE 120 and the base station 110 may perform a beam failure recovery procedure using the PCell or a PSCell (if configured) based at least in part on the beam failure on the SCell. For example, in some aspects, the UE 120 may transmit a beam failure recovery scheduling request (BFR-SR) on the PCell or the PSCell via a physical uplink control channel (PUCCH) using a dedicated PUCCH resource. The BFR-SR may trigger beam failure recovery. Based at least in part on receiving the BFR-SR from the UE 120, the base station 110 may transmit, on the PCell or the PSCell, a physical downlink control channel (PDCCH) communication that schedules a PUCCH communication for beam failure recovery. For example, in some aspects, the PDCCH may be scrambled by a radio network temporary identifier dedicated to SCell beam failure recovery.

As further shown in FIG. 7, the UE 120 may receive the PDCCH communication from the base station 110, and may transmit the scheduled PUCCH communication on the PCell or the PSCell. The PUCCH communication may generally include information to enable recovery from the beam failure on the SCell. For example, the information to enable recovery from the SCell beam failure may include information to identify the SCell that experienced the beam failure, an index associated with a candidate beam to replace the failed beam, and/or the like. In some aspects, the PUCCH communication that includes the information to enable recovery from the beam failure may include a medium access control (MAC) control element (MAC-CE) that identifies the failed SCell and the candidate beam to replace the failed beam. Based at least in part on receiving the PUCCH communication, the base station 110 may transmit, on the PCell or the PSCell, a PDCCH communication that instructs the UE 120 regarding the beam failure recovery procedure. For example, the PDCCH communication may instruct the UE 120 to perform a random access channel (RACH) procedure for the SCell on one or more candidate beams. The UE 120 may perform beam failure recovery according to the PDCCH communication to obtain a new beam to recover from the beam failure and re-enable communications on the SCell.

As described above, the beam failure may occur on the SCell due to a change in channel conditions, mobility of the UE 120, and/or the like. Accordingly, in some cases, the BFR-SR that the UE 120 transmits to initiate the beam failure recovery procedure may not be received by the base station 110 (e.g., due to beam blockage, path loss, and/or the like). Additionally, or alternatively, the BFR-SR may reach the base station 110, but the UE 120 may not transmit the MAC-CE that includes the information to enable recovery from the SCell beam failure (e.g., in cases where a PDCCH that the base station 110 transmits to acknowledge the BFR-SR is not received by the UE 120). Accordingly, if the BFR-SR is not received by the base station 110 and/or the UE 120 does not transmit the MAC-CE that includes the information to enable recovery from the SCell beam failure, the UE 120 and the base station 110 may be unable to re-enable communications on the SCell. Some aspects described herein relate to techniques and apparatuses to enable beam failure recovery in an SCell in cases where the BFR-SR is not received by the base station 110 and/or the UE 120 does not transmit the MAC-CE that includes the information to enable recovery from the SCell beam failure, which may improve reliability of SCell communication, reduce network loading or balance a load across carriers by offloading at least some traffic to the SCell, and/or the like.

As indicated above, FIG. 7 is provided as an example. Other examples may differ from what is described with respect to FIG. 7.

Figure 8:
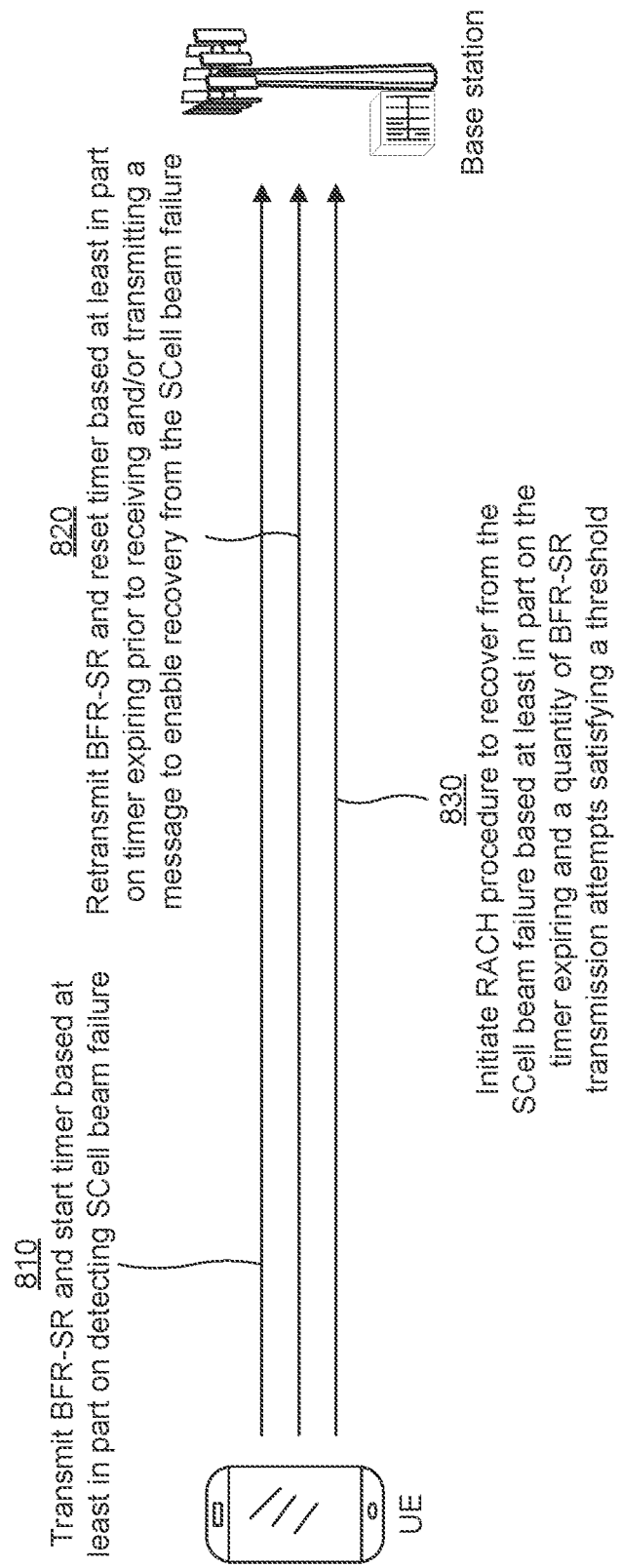
FIG. 8 is a diagram illustrating an example associated with beam failure recovery in a secondary cell (SCell), in accordance with various aspects of the present disclosure.

FIG. 8 is a diagram illustrating an example 800 associated with beam failure recovery in an SCell, in accordance with various aspects of the present disclosure. As shown in FIG. 8, a base station (e.g., base station 110 and/or the like) and a UE (e.g., UE 120 and/or the like) may communicate in a wireless network (e.g., wireless network 100 and/or the like) using carrier aggregation. Using carrier aggregation, the base station and the UE may communicate with one another using a PCell and one or more SCells. In some aspects, the one or more SCells may be configured for downlink communication only, for uplink communication only, or for downlink and uplink communication. Furthermore, in some aspects, one SCell in an SCell group may be designated or otherwise configured as a PSCell.

As shown in FIG. 8, and by reference number 810, the UE may transmit a beam failure recovery scheduling request (BFR-SR) to the base station based at least in part on detecting a beam failure on an SCell. For example, in some aspects, the UE may transmit the BFR-SR on the PCell or a PSCell (if configured) via a PUCCH using a dedicated PUCCH resource. As further shown by reference number 810, the UE 120 may start a timer when the BFR-SR is transmitted to the base station. For example, in some aspects, the timer may have a value configured by the base station via RRC signaling (e.g., the timer may correspond to an 'sr-ProhibitTimer' parameter that is RRC-configured per scheduling request configuration, whereby the base station may RRC-configure a specific value of the 'sr-Prohibit-Timer' parameter for the BFR-SR).

Accordingly, in cases where the UE receives a PDCCH from the base station as a response to acknowledge the BFR-SR prior to the timer expiring, the UE may transmit the MAC-CE to recover from the SCell beam failure in a similar manner as described above with respect to FIG. 7. However, in cases where the timer expires prior to the UE receiving the PDCCH acknowledging the BFR-SR and/or the timer expires prior to the UE transmitting a MAC-CE that includes the information to enable recovery from the SCell beam failure, the UE may take additional measures to recover from the SCell beam failure. For example, as shown in FIG. 8, and by reference number 820, the UE may retransmit the BFR-SR based at least in part on the timer expiring prior to the UE receiving a response to acknowledge the BFR-SR and schedule transmission of the MAC-CE including information to recover from the beam failure.

For example, as described above, the response to the BFR-SR may be a PDCCH that is scrambled by a special RNTI dedicated to SCell beam failure recovery and schedules transmission of the MAC-CE that includes the information to enable recovery from the SCell beam failure. Accordingly, the UE may retransmit the BFR-SR and reset the timer in cases where the timer expires prior to the UE receiving a PDCCH scrambled by the RNTI dedicated to SCell beam failure recovery. Additionally, or alternatively, the UE may retransmit the BFR-SR and reset the timer in cases where the timer expires prior to the UE transmitting the MAC-CE that includes the information to enable recovery from the SCell beam failure. In this way, the UE may retransmit the BFR-SR each time that the timer expires, and the UE may reset the timer each time that the BFR-SR is retransmitted. However, to prevent the UE from continually retransmitting the BFR-SR (e.g., in cases where channel conditions are interfering with reception of the BFR-SR at the base station), the UE may be configured with a threshold that defines a maximum number of BFR-SR retransmission attempts. For example, in some aspects, the threshold may be defined in an RRC-configured parameter for the BFR-SR (e.g., 'sr-TransMax'). Accordingly, the UE may retransmit the BFR-SR and reset the timer each time that the timer expires prior to the UE receiving a response to the BFR-SR from the base station and/or prior to the UE transmitting the MAC-CE while a quantity of BFR-SR transmission attempts (e.g., including the initial BFR-SR transmission) fails to satisfy (e.g., is less than or equal to) the threshold that defines the maximum number of BFR-SR retransmission attempts.

Alternatively, as shown in FIG. 8, and by reference number 830, the UE may initiate a RACH procedure to recover from the SCell beam failure based at least in part on the timer expiring and a quantity of BFR-SR transmission attempts satisfying (e.g., equaling or exceeding) the threshold that defines the maximum number of BFR-SR retransmission attempts. In this case, the UE may initiate the RACH procedure on the PCell or a PSCell (if configured), and may send the MAC-CE that includes the information to enable recovery from the SCell beam failure in one or more uplink messages associated with the RACH procedure. For example, in some aspects, the UE may transmit the MAC-CE to indicate the SCell beam failure in msg3 or a later uplink message of a four-step RACH procedure, in a msgA payload or a later uplink message of a two-step RACH procedure, and/or the like. Furthermore, as described above, the MAC-CE may identify the SCell associated with the beam failure, an index associated with a new candidate beam to be used for the SCell associated with the beam failure, and/or the like. Additionally, or alternatively, the MAC-CE that is transmitted during the RACH procedure may have a format that can be used to generally indicate beam failure for any cell, including an SCell, a PCell, a PSCell, and/or the like. In some aspects, the RACH procedure that is initiated by the UE on the PCell or the PSCell may be a contention-free random access procedure in cases where a contention-free random access resource is configured for the UE. Additionally, or alternatively, the RACH procedure that is initiated by the UE on the PCell or the PSCell may be a contention-based random access procedure (e.g., in cases where a contention-free random access resource is not configured for the UE). In this way, the UE and the base station may recover from the SCell beam failure and re-enable communication via the SCell even in cases where the BFR-SR transmitted by the UE is not received by the base station, the PDCCH scheduling the MAC-CE is not received by the UE, and/or the like.

As indicated above, FIG. 8 is provided as an example. Other examples may differ from what is described with respect to FIG. 8.

Figure 9:
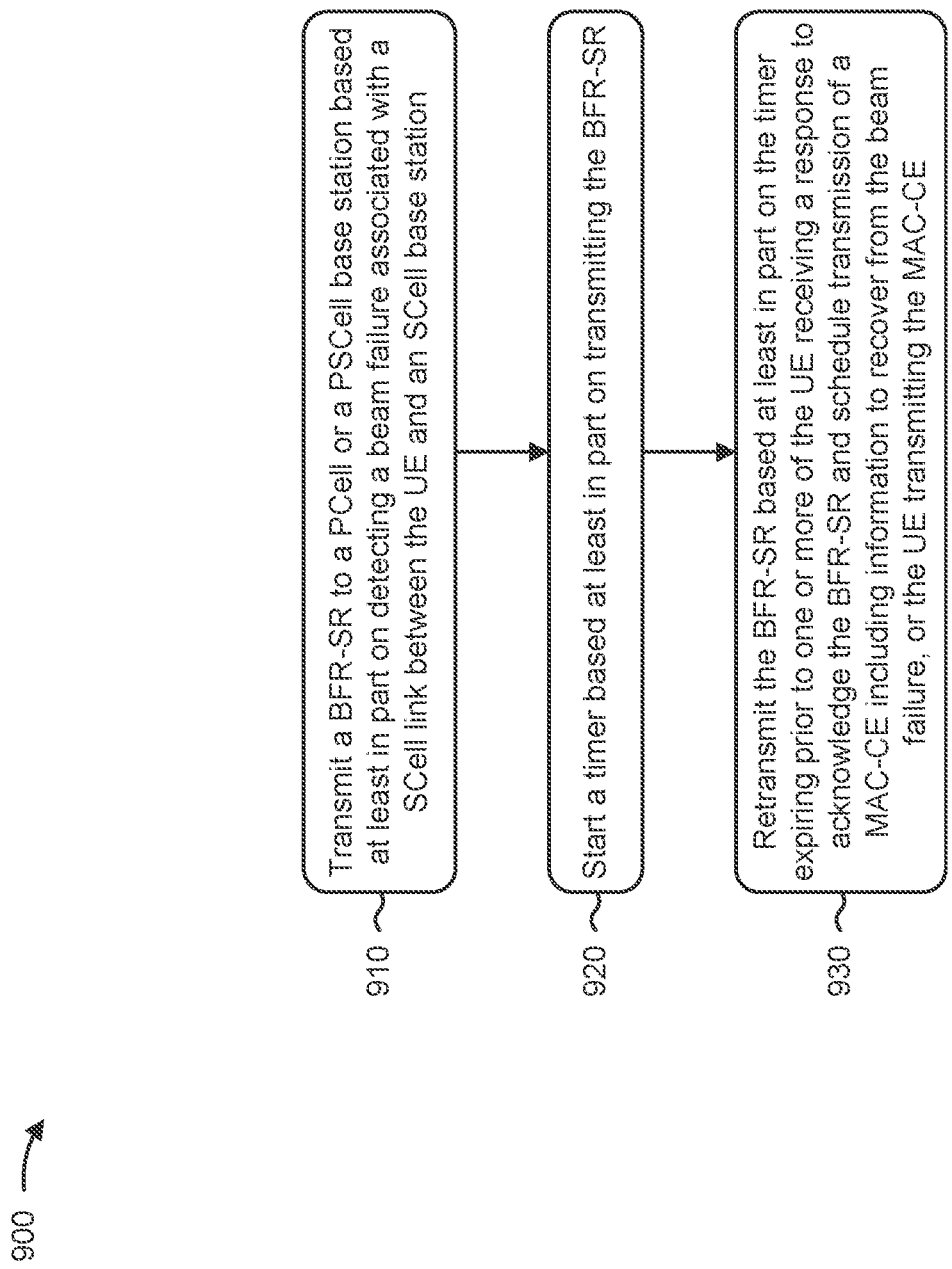
FIG. 9 is a diagram illustrating an example process associated with beam failure recovery in an SCell, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 and/or the like) performs operations associated with beam failure recovery in an SCell.

As shown in FIG. 9, in some aspects, process 900 may include transmitting a BFR-SR to a PCell or a PSCell base station based at least in part on detecting a beam failure associated with an SCell link between the UE and an SCell base station (block 910). For example, the UE may transmit (e.g., using antenna 252, transmit processor 264, TX MIMO processor 266, modulator 254, controller/processor 280, and/or memory 282) a BFR-SR to a PCell or a PSCell base station based at least in part on detecting a beam failure associated with an SCell link between the UE and an SCell base station, as described above.

As further shown in FIG. 9, in some aspects, process 900 may include starting a timer based at least in part on transmitting the BFR-SR (block 920). For example, the UE may start (e.g., using controller/processor 280, memory 282, and/or the like) a timer based at least in part on transmitting the BFR-SR, as described above.

As further shown in FIG. 9, in some aspects, process 900 may include retransmitting the BFR-SR based at least in part on the timer expiring prior to one or more of the UE receiving a response to acknowledge the BFR-SR and schedule transmission of a MAC-CE including information to recover from the beam failure, or the UE transmitting the MAC-CE (block 930). For example, the UE may retransmit (e.g., using controller/processor 280, transmit processor 264, TX MIMO processor 266, MOD 254, antenna 252, memory 282, and/or the like) the BFR-SR based at least in part on the timer expiring prior to the UE receiving a response to acknowledge the BFR-SR and schedule transmission of a MAC-CE including information to recover from the beam failure, or prior to the UE transmitting the MAC-CE, as described above.

Process 900 may include additional aspects, such as any single aspect or any combination of aspects described below and/or in connection with one or more other processes described elsewhere herein.

In a first aspect, the BFR-SR is transmitted over a dedicated PUCCH resource.

In a second aspect, alone or in combination with the first aspect, the BFR-SR is transmitted over one or more of a PCell or a PSCell associated with the SCell associated with the beam failure.

In a third aspect, alone or in combination with one or more of the first and second aspects, process 900 includes restarting the timer based at least in part on retransmitting the BFR-SR, receiving a response acknowledging the retransmitted BFR-SR prior to the restarted timer expiring, where the response acknowledging the retransmitted BFR-SR includes information to schedule transmission of the MAC-CE, and transmitting the MAC-CE including the information to recover from the beam failure based at least in part on the response acknowledging the retransmitted BFR-SR.

In a fourth aspect, alone or in combination with one or more of the first through third aspects, the information to recover from the beam failure includes information to identify one or more of the SCell link associated with the beam failure or an index associated with a candidate beam to be used for the SCell link.

In a fifth aspect, alone or in combination with one or more of the first through fourth aspects, the response to acknowledge the BFR-SR includes a PDCCH transmission scrambled by an RNTI dedicated to SCell beam failure recovery.

In a sixth aspect, alone or in combination with one or more of the first through fifth aspects, the BFR-SR is retransmitted based at least in part on a quantity of BFR-SR transmission attempts failing to satisfy a threshold.

In a seventh aspect, alone or in combination with one or more of the first through sixth aspects, process 900 includes initiating a RACH procedure to recover from the beam failure based at least in part on determining that the timer has expired prior to the UE transmitting the MAC-CE including the information to recover from the beam failure and prior to the UE receiving the response to acknowledge the retransmitted BFR-SR, and further based at least in part on determining that a quantity of BFR-SR transmission attempts satisfies a threshold.

In an eighth aspect, alone or in combination with one or more of the first through seventh aspects, process 900 includes transmitting the MAC-CE including the information to recover from the beam failure in one or more uplink messages associated with the RACH procedure.

In a ninth aspect, alone or in combination with one or more of the first through eighth aspects, the RACH procedure is initiated over one or more of a PCell or a PSCell associated with the SCell associated with the beam failure.

In a tenth aspect, alone or in combination with one or more of the first through ninth aspects, the RACH procedure is a contention-free RACH procedure based at least in part on the UE having a configured contention-free random access resource.

In an eleventh aspect, alone or in combination with one or more of the first through tenth aspects, the RACH procedure is a contention-based RACH procedure.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
transmitting a beam failure recovery scheduling request (BFR-SR) to a primary cell (PCell) or a primary secondary cell (PSCell) base station based at least in part on detecting a beam failure associated with a secondary cell (SCell) link between the UE and an SCell base station;
starting a timer based at least in part on transmitting the BFR-SR;
retransmitting the BFR-SR based at least in part on the timer expiring prior to one or more of:
the UE receiving a response to acknowledge the BFR-SR and schedule transmission of a medium access control (MAC) control element (MAC-CE) including information to recover from the beam failure, or
the UE transmitting the MAC-CE; and
initiating a random access channel (RACH) procedure to recover from the beam failure based at least in part on at least one of:
determining that the timer has expired prior to the UE transmitting the MAC-CE including the information to recover from the beam failure and prior to the UE receiving the response to acknowledge the retransmitted BFR-SR, or
determining that a quantity of BFR-SR transmission attempts satisfies a threshold.

2. The method of claim 1, further comprising:
transmitting the MAC-CE including the information to recover from the beam failure in one or more uplink messages associated with the RACH procedure.

3. The method of claim 1, wherein the RACH procedure is initiated over one or more of a PCell or a PSCell associated with the SCell associated with the beam failure.

4. The method of claim 1, wherein the RACH procedure is a contention-free RACH procedure based at least in part on the UE having a configured contention-free random access resource.

5. The method of claim 1, wherein the RACH procedure is a contention-based RACH procedure.

6. A user equipment (UE) for wireless communication, comprising:
a memory; and
one or more processors coupled to the memory, the one or more processors configured to:
transmit a beam failure recovery scheduling request (BFR-SR) to a primary cell (PCell) or a primary secondary cell (PSCell) base station based at least in part on detecting a beam failure associated with a secondary cell (SCell) link between the UE and an SCell base station;
start a timer based at least in part on transmitting the BFR-SR;
retransmit the BFR-SR based at least in part on the timer expiring prior to one or more of:
the UE receiving a response to acknowledge the BFR-SR and schedule transmission of a medium access control (MAC) control element (MAC-CE) including information to recover from the beam failure, or
the UE transmitting the MAC-CE; and
initiate a random access channel (RACH) procedure to recover from the beam failure based at least in part on at least one of:
determining that the timer has expired prior to the UE transmitting the MAC-CE including the information to recover from the beam failure and prior to the UE receiving the response to acknowledge the retransmitted BFR-SR, or
determining that a quantity of BFR-SR transmission attempts satisfies a threshold.

7. The UE of claim 6, wherein the one or more processors are further configured to:
transmit the MAC-CE including the information to recover from the beam failure in one or more uplink messages associated with the RACH procedure.

8. The UE of claim 6, wherein the RACH procedure is initiated over one or more of a PCell or a PSCell associated with the SCell associated with the beam failure.

9. The UE of claim 6, wherein the RACH procedure is a contention-free RACH procedure based at least in part on the UE having a configured contention-free random access resource.

10. The UE of claim 6, wherein the RACH procedure is a contention-based RACH procedure.

11. The method of claim 1, wherein the BFR-SR is transmitted over a dedicated physical uplink control channel resource.

12. The method of claim 1, wherein the BFR-SR is transmitted over one or more of a PCell or a PSCell associated with the SCell associated with the beam failure.

13. The method of claim 1, wherein the response to acknowledge the BFR-SR includes a physical downlink control channel transmission scrambled by a radio network temporary identifier dedicated to SCell beam failure recovery.

14. The UE of claim 6, wherein the BFR-SR is transmitted over a dedicated physical uplink control channel resource.

15. The UE of claim 6, wherein the BFR-SR is transmitted over one or more of a PCell or a PSCell associated with the SCell associated with the beam failure.

16. The UE of claim 6, wherein the response to acknowledge the BFR-SR includes a physical downlink control channel transmission scrambled by a radio network temporary identifier dedicated to SCell.

17. The method of claim 1, wherein initiating the RACH procedure to recover from the beam failure is based at least in part on determining that the quantity of BFR-SR transmission attempts satisfies the threshold.

18. The UE of claim 6, wherein, to initiate the RACH procedure to recover from the beam failure, the one or more processors are configured to:
initiate the RACH procedure to recover from the beam failure based at least in part on determining that the timer has expired prior to the UE transmitting the MAC-CE including the information to recover from the beam failure and prior to the UE receiving the response to acknowledge the retransmitted BFR-SR.

19. A non-transitory computer-readable medium storing a set of instructions for wireless communication, the set of instructions comprising:
one or more instructions that, when executed by one or more processors of a user equipment (UE), cause the UE to:
transmit a beam failure recovery scheduling request (BFR-SR) to a primary cell (PCell) or a primary secondary cell (PSCell) base station based at least in part on detecting a beam failure associated with a secondary cell (SCell) link between the UE and an SCell base station;
start a timer based at least in part on transmitting the BFR-SR;
retransmit the BFR-SR based at least in part on the timer expiring prior to one or more of:
the UE receiving a response to acknowledge the BFR-SR and schedule transmission of a medium access control (MAC) control element (MAC-CE) including information to recover from the beam failure, or
the UE transmitting the MAC-CE; and
initiate a random access channel (RACH) procedure to recover from the beam failure based at least in part on at least one of:
determining that the timer has expired prior to the UE transmitting the MAC-CE including the information to recover from the beam failure and prior to the UE receiving the response to acknowledge the retransmitted BFR-SR, or
determining that a quantity of BFR-SR transmission attempts satisfies a threshold.

20. The non-transitory computer-readable medium of claim 19, wherein the one or more instructions, when executed by the one or more processors, further cause the UE to:
transmit the MAC-CE including the information to recover from the beam failure in one or more uplink messages associated with the RACH procedure.

21. The non-transitory computer-readable medium of claim 19, wherein the RACH procedure is initiated over one or more of a PCell or a PSCell associated with the SCell associated with the beam failure.

22. The non-transitory computer-readable medium of claim 19, wherein the one or more instructions, that cause the UE to initiate the RACH procedure, cause the UE to:
initiate the RACH procedure to recover from the beam failure based at least in part on determining that the quantity of BFR-SR transmission attempts satisfies the threshold.

23. An apparatus for wireless communication, comprising:
means for transmitting a beam failure recovery scheduling request (BFR-SR) to a primary cell (PCell) or a primary secondary cell (PSCell) base station based at least in part on detecting a beam failure associated with a secondary cell (SCell) link between the apparatus and an SCell base station;
means for starting a timer based at least in part on transmitting the BFR-SR;
means for retransmitting the BFR-SR based at least in part on the timer expiring prior to one or more of:
the apparatus receiving a response to acknowledge the BFR-SR and schedule transmission of a medium access control (MAC) control element (MAC-CE) including information to recover from the beam failure, or
the apparatus transmitting the MAC-CE; and
means for initiating a random access channel (RACH) procedure to recover from the beam failure based at least in part on at least one of:
determining that the timer has expired prior to the apparatus transmitting the MAC-CE including the information to recover from the beam failure and prior to the apparatus receiving the response to acknowledge the retransmitted BFR-SR, or
determining that a quantity of BFR-SR transmission attempts satisfies a threshold.

24. The apparatus of claim 23, further comprising:
means for transmitting the MAC-CE including the information to recover from the beam failure in one or more uplink messages associated with the RACH procedure.

25. The apparatus of claim 23, wherein the RACH procedure is initiated over one or more of a PCell or a PSCell associated with the SCell associated with the beam failure.

26. The apparatus of claim 23, wherein means for initiating the RACH procedure to recover from the beam failure comprises:
means for initiating the RACH procedure to recover from the beam failure is based at least in part on determining that the quantity of BFR-SR transmission attempts satisfies the threshold.

27. The method of claim 1, wherein initiating the RACH procedure to recover from the beam failure is based at least in part on determining that the timer has expired prior to the UE transmitting the MAC-CE including the information to recover from the beam failure and prior to the UE receiving the response to acknowledge the retransmitted BFR-SR.

28. The UE of claim 6, wherein, to initiate the RACH procedure to recover from the beam failure, the one or more processors are configured to:
initiate the RACH procedure to recover from the beam failure based at least in part on determining that the quantity of BFR-SR transmission attempts satisfies the threshold.

29. The non-transitory computer-readable medium of claim 19, wherein the one or more instructions, that cause the UE to initiate the RACH procedure, cause the UE to:
initiate the RACH procedure to recover from the beam failure based at least in part on determining that the timer has expired prior to the UE transmitting the MAC-CE including the information to recover from the beam failure and prior to the UE receiving the response to acknowledge the retransmitted BFR-SR.

30. The apparatus of claim 23, wherein means for initiating the RACH procedure to recover from the beam failure comprises:
means for initiating the RACH procedure to recover from the beam failure is based at least in part on determining that the timer has expired prior to the apparatus transmitting the MAC-CE including the information to recover from the beam failure and prior to the UE receiving the response to acknowledge the retransmitted BFR-SR.

* * * * *